(12) United States Patent
Kariveti

(10) Patent No.: US 10,688,441 B2
(45) Date of Patent: Jun. 23, 2020

(54) INTEGRATED ULTRAFILTRATION MEMBRANE AND ION-EXCHANGE FILTRATION SYSTEM

(71) Applicant: Mann+Hummel GMBH, Ludwigsburg (DE)

(72) Inventor: Sreenath Kariveti, Raleigh, NC (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 273 days.

(21) Appl. No.: 15/491,623

(22) Filed: Apr. 19, 2017

(65) Prior Publication Data

US 2018/0304202 A1 Oct. 25, 2018

(51) Int. Cl.
| | |
|---|---|
| *B01D 65/00* | (2006.01) |
| *B01D 61/14* | (2006.01) |
| *B01D 61/16* | (2006.01) |
| *B01D 61/18* | (2006.01) |
| *B01D 63/06* | (2006.01) |
| *B01J 47/12* | (2017.01) |
| *C02F 1/42* | (2006.01) |
| *C02F 1/44* | (2006.01) |
| *C02F 1/28* | (2006.01) |

(52) U.S. Cl.
CPC .......... *B01D 65/00* (2013.01); *B01D 61/145* (2013.01); *B01D 61/16* (2013.01); *B01D 61/18* (2013.01); *B01D 63/06* (2013.01); *B01J 47/12* (2013.01); *C02F 1/42* (2013.01); *C02F 1/444* (2013.01); *B01D 2311/06* (2013.01); *B01D 2311/2623* (2013.01); *B01D 2313/04* (2013.01); *B01D 2313/08* (2013.01); *B01D 2313/10* (2013.01); *B01D 2313/21* (2013.01); *B01D 2313/44* (2013.01); *B01D 2315/08* (2013.01); *B01D 2315/10* (2013.01); *B01D 2317/08* (2013.01); *B01D 2319/022* (2013.01); *B01D 2319/025* (2013.01); *B01D 2319/06* (2013.01); *B01D 2325/42* (2013.01); *C02F 1/283* (2013.01); *C02F 2201/003* (2013.01); *C02F 2201/006* (2013.01)

(58) Field of Classification Search
None
See application file for complete search history.

(56) References Cited

U.S. PATENT DOCUMENTS

| | | | |
|---|---|---|---|
| 2005/0035041 A1* | 2/2005 | Nohren, Jr. | A45F 3/16 210/209 |
| 2005/0067340 A1 | 3/2005 | Broens et al. | |

(Continued)

FOREIGN PATENT DOCUMENTS

| | | |
|---|---|---|
| CN | 1036817 A | 11/1989 |
| EP | 2719668 A1 | 4/2014 |

(Continued)

*Primary Examiner* — Krishnan S Menon

(57) ABSTRACT

An ion-exchange and ultrafiltration filter system having an exterior housing having an inlet and an outlet with an ultrafiltration membrane provided within the housing along a central axis about a central portion of the housing with an ion-exchange membrane provided within the housing between the ultrafiltration membrane and the housing. The ion-exchange and ultrafiltration filter system being capable of being configured so as to provide two-step filtration in a plurality of modes, either ion-exchange to ultrafiltration, or ultrafiltration to ion-exchange.

10 Claims, 16 Drawing Sheets

(56) References Cited

U.S. PATENT DOCUMENTS

2010/0044311 A1* 2/2010 Kobayashi ............ B01D 61/16
210/638
2015/0290380 A1 10/2015 Welzel et al.
2015/0298995 A1 10/2015 Johann et al.

FOREIGN PATENT DOCUMENTS

| JP | S6365910 A | 3/1988 |
| JP | H0356126 A | 3/1991 |
| JP | H03238083 A | 10/1991 |
| JP | H06170363 A | 6/1994 |
| JP | H0747242 A | 2/1995 |
| JP | H0768135 A | 3/1995 |
| JP | 2011016119 A | 1/2011 |
| KR | 101433533 B1 | 8/2014 |

\* cited by examiner

INTEGRATED ULTRAFILTRATION MEMBRANE AND ION-EXCHANGE FILTRATION SYSTEM

TECHNICAL FIELD

The present disclosure generally relates to the field of ultrafiltration and ion-exchange systems for the purpose of purifying water or other fluid streams.

BACKGROUND

Filtration systems operate in a wide variety of applications, even when constrained to water filters. Such filters can be found anywhere from wastewater plants to nuclear power plants, and from commercial application, to hospitals. It is well understood that these systems operate in an optimal fashion when the filter elements are replaced or cleaned at very particular intervals. In particular systems ion-exchange can be performed prior to particulate removal using an ultrafiltration membrane. In yet additional systems ultrafiltration can be performed prior to the ion-exchange. It will be appreciated that these systems have been separate and distinct systems which can be large and burdensome to maintain and/or replace.

SUMMARY OF THE INVENTION

Contemplated herein is a combination ion-exchange and ultrafiltration filter system, which is compact and capable of being configured to provide particulate filtration and ion-exchange in a number of different applications. Included in this combination filtration system is a housing having an inlet and an outlet, wherein the inlet receives a flow of a contaminated liquid and the outlet provides a purified stream with desired ionic properties.

Within the housing an ultrafiltration membrane provided about a central portion of the housing or along a central axis thereof. An ion-exchange membrane can then be provided within the housing between the ultrafiltration membrane and the housing so as to encompass a portion of the ultrafiltration membrane.

In some embodiments, the inlet can be provided about a sidewall of the housing, and the outlet can be provided about an axial end. In this embodiment, the filter system can then be configured such that a contaminated stream being directed through the inlet passes first through the ion-exchange membrane and then through the ultrafiltration membrane before exiting the outlet.

In some alternative embodiments, the outlet can instead be provided about a sidewall of the housing, and the inlet can be provided about an axial end. In this embodiment, the filter system can then be configured such that a contaminated stream being directed through the inlet passes first through the ultrafiltration membrane and then through the ion-exchange membrane before exiting the outlet.

In yet additional embodiments the ion-exchange membrane can include a plurality of latticed layers with a desired ion-exchange resin, as one form of media, provided in each of the layers. In some such embodiments, each layer can be sealed from any adjacent layers, thus forcing the flow to pass through the various ion-exchange layers in alternating axial directions.

It will be appreciated that in various embodiments the ion-exchange membrane can include an internal lattice structure and an ion-exchange resin which can define a plurality of passageways so as to maximize the contact between the fluid passing therethrough and the ion-exchange resin over time as the resin depletes.

In yet additional embodiments the ultrafiltration membrane can include an ultrafiltration housing. The ultrafiltration housing can house a plurality of tubular ultrafiltration media extending axially along the length of the ultrafiltration housing. In some such embodiments, an axis of the ultrafiltration housing can be provided in a configuration being parallel with an axis of the housing of the filter system. In some such embodiments a first end of each of the tubular ultrafiltration media can be open, wherein the space between each of the ultrafiltration media at the first end is blocked, and wherein a second end of each of the tubular ultrafiltration media is blocked, and wherein the space between each of the ultrafiltration media at the second end includes at least one aperture, so as to force any fluid passing from the first end to the second end to enter the tubular ultrafiltration media and pass through a sidewall portion of at least one tubular ultrafiltration structure, and exit the second end.

In yet additional embodiments the external housing can also contain a cap having a plurality of guided channels, the cap being provided within the external housing, and the plurality of guided channels being configured to direct fluid exiting the ultrafiltration membrane into an end portion of the ion-exchange membrane. In some such embodiments, the cap can be sealed against end portions of the ultrafiltration membrane and the ion-exchange membrane.

Also contemplated herein is a method of filtering a fluid flow, such a method can include the steps of: providing an housing having an inlet and an outlet; providing an ultrafiltration membrane within the housing along a central axis of the housing; providing an ion-exchange membrane provided within the housing encompassing a portion of the ultrafiltration membrane; and directing a flow of contaminated fluid into the inlet of the external housing, wherein the flow is configured to travel through both the ultrafiltration membrane and the ion-exchange membrane so as to purify the flow and provide ion-exchange to the fluid.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein.

DETAILED DESCRIPTION OF THE INVENTION

As discussed above, contemplated herein is a combination ion-exchange and ultrafiltration filter system which can be utilized in a variety of applications yet is small and compact which eliminates the need for a dual component system and instead integrates two processes into a singular add-on housing. In accordance with this and various other aspects of the present invention a combination ion-exchange and ultrafiltration filter system, various embodiments of which are illustrated in FIGS. 3-16, allows for a two-stage filtration to process a stream using a singular housing.

It will be understood that while the combination ion-exchange and ultrafiltration filter system will be discussed primarily with regard to water ionization and purification that it can be similarly applied to alternative solutions or fluids as desired. By way of example such filtration can be utilized for applications ranging from water purification to the industrial applications such as metal separation, pharmaceutical and biopharma production, as well as sugar manufacturing, and even juice or dairy processing.

It will also be understood that the combination ion-exchange and ultrafiltration filter system can have varying configurations regarding to inlet and outlet so as to allow for switching between whether ion-exchange occurs first and ultrafiltration second, or whether ultrafiltration occurs first and ion-exchange second. In some embodiments described, this can be achieved by merely switching or reversing the inlet and outlet. However, it will be appreciated, that various housing configurations can allow for the filtration system to provide flow-through filtration for recycling the water, or forced filtrations which requires all of the water passing through the filter housing to be filtered.

Figure 1:
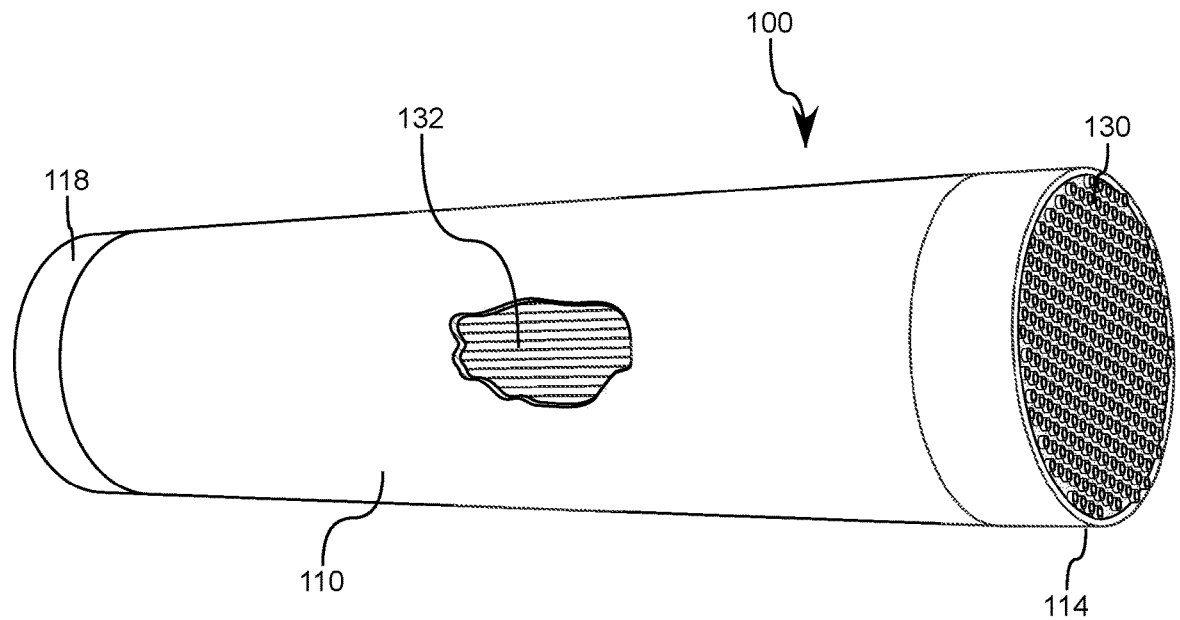
FIG. 1 illustrates a perspective view of an exemplary ultrafiltration membrane adaptable for use in various aspects of the present invention.
Figure 2:
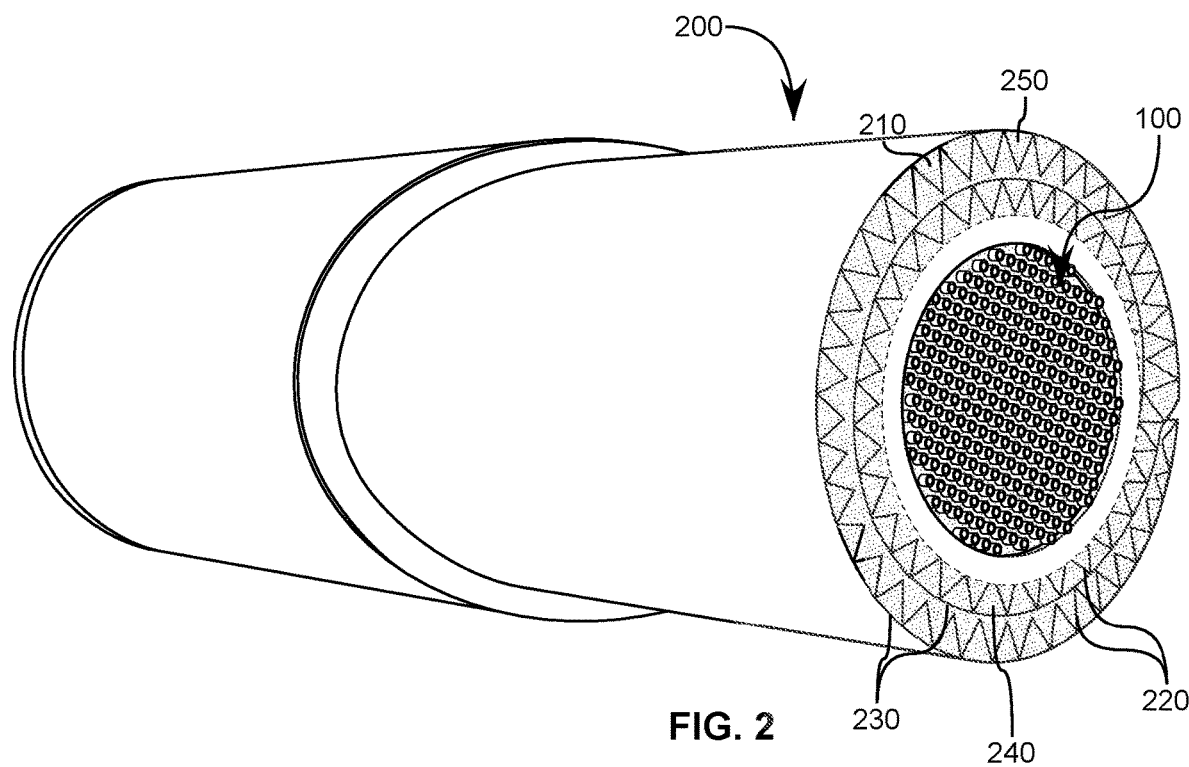
FIG. 2 illustrates a perspective view of an exemplary ultrafiltration membrane being surrounded by an ion-exchange membrane also adaptable for use in various aspects of the present invention.

FIG. 1 illustrates a perspective partial end views of an exemplary ultrafiltration membrane 100 adaptable for use in the various systems contemplated and discussed herein. The ultrafiltration membrane 100 can be provided with an ultrafiltration housing 110 which is configured to house a plurality of tubular ultrafiltration media 130 which extend axially along the length of the ultrafiltration housing 110.

FIGS. 2-15 illustrate the same ultrafiltration membrane 100 being provided with an ion-exchange media or membrane 200 provided around the ultrafiltration membrane 100 in various configurations. As shown the ultrafiltration membrane 100 and the ion-exchange membrane 200 can be configured to nest one within another, and can be configured to allow for radial flow inwardly or outwardly. Alternatively, the ion-exchange membrane 200 and ultrafiltration membrane 100 can be configured to be sealed from one another radially and be configured to exchange flow only about their axial ends. Both configurations will be discussed in more detail below.

The ion-exchange membrane 200 can be provided as a continuous sheet with tapered ends which can then be wrapped around the ultrafiltration media/membrane so as to fill up a majority of the space between the ultrafiltration membrane and an external housing sidewall of a housing containing the membranes. In some embodiments, the ion-exchange membrane 200 can be provided as a single layer (not shown) or as a plurality of layers or wrappings. Each layer or wrapping can be packed with an ion-exchange resin 210 supported between or about a lattice structure 220. In some instances, the lattice structure 220 can be permeable so as to allow flow to pass between different portions of the lattice structure 220 in each layer. In some embodiments, the inner or outer surfaces 230 of the ion-exchange membrane 200 can be provided of an impermeable substance such that flow can be limited or eliminated between the various layers. In this manner, contaminated flow can be directed into an end portion of the ion-exchange membrane 200 and forced along the entire length of a first layer, then be re-directed through the entire axial length of the ion-exchange membrane 200 through a second layer, and again for any number of additional layers as can be provided, before finally reaching the outlet, or prior to entering the ultrafiltration membrane 100 depending on the configuration. In this manner the entire ion-exchange membrane can require multiple contact passes with the ion-exchange media provided therein.

Figure 3:
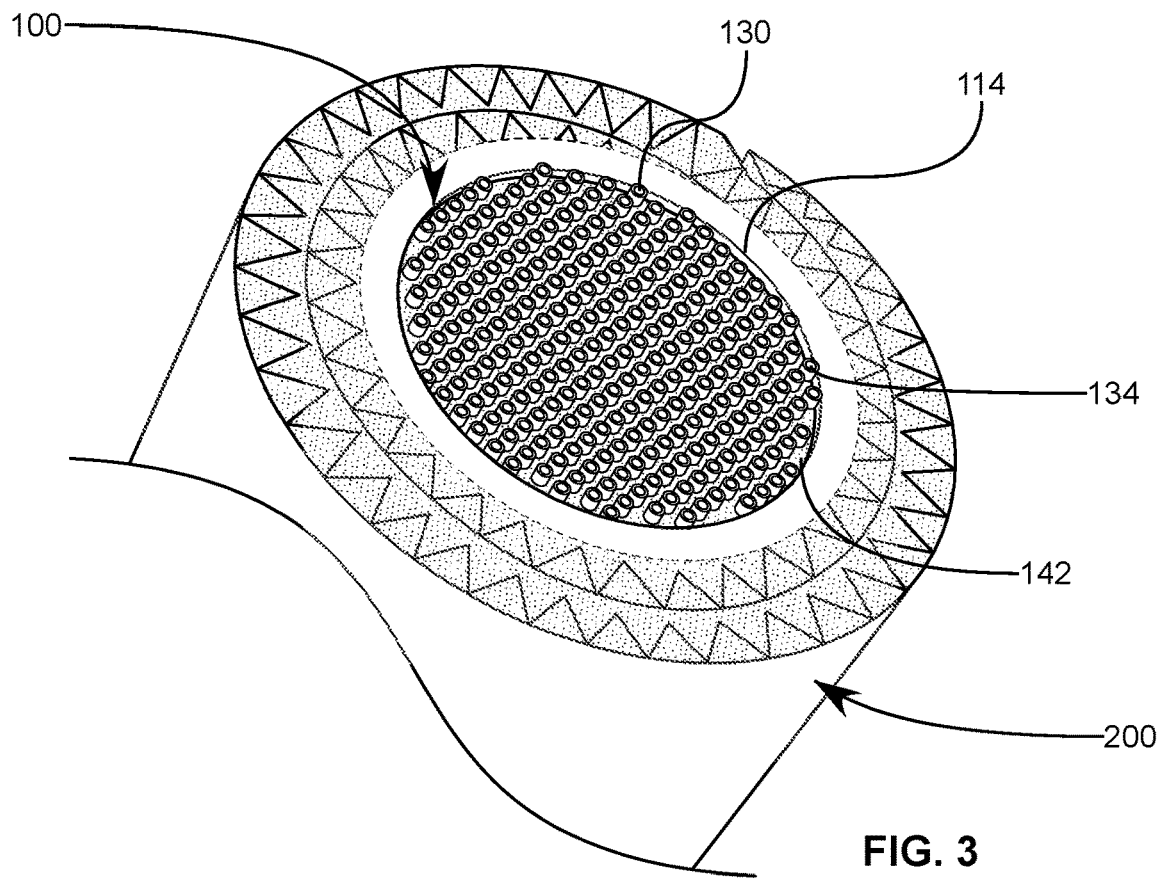
FIG. 3 illustrates a partial perspective end view of a first end of an exemplary ultrafiltration membrane being surrounded by an ion-exchange membrane being adaptable for use in various aspects of the present invention.

In some embodiments, and as illustrated in FIG. 3, a first end 114 of each of the tubular ultrafiltration media 130 can be open, wherein the space between each of the ultrafiltration media at the first end 114 is blocked, and the water is forced to flow into an interior of an open end 134 through a sidewall, and into an interior of the housing 110, or out of a permeable end.

Figure 4:
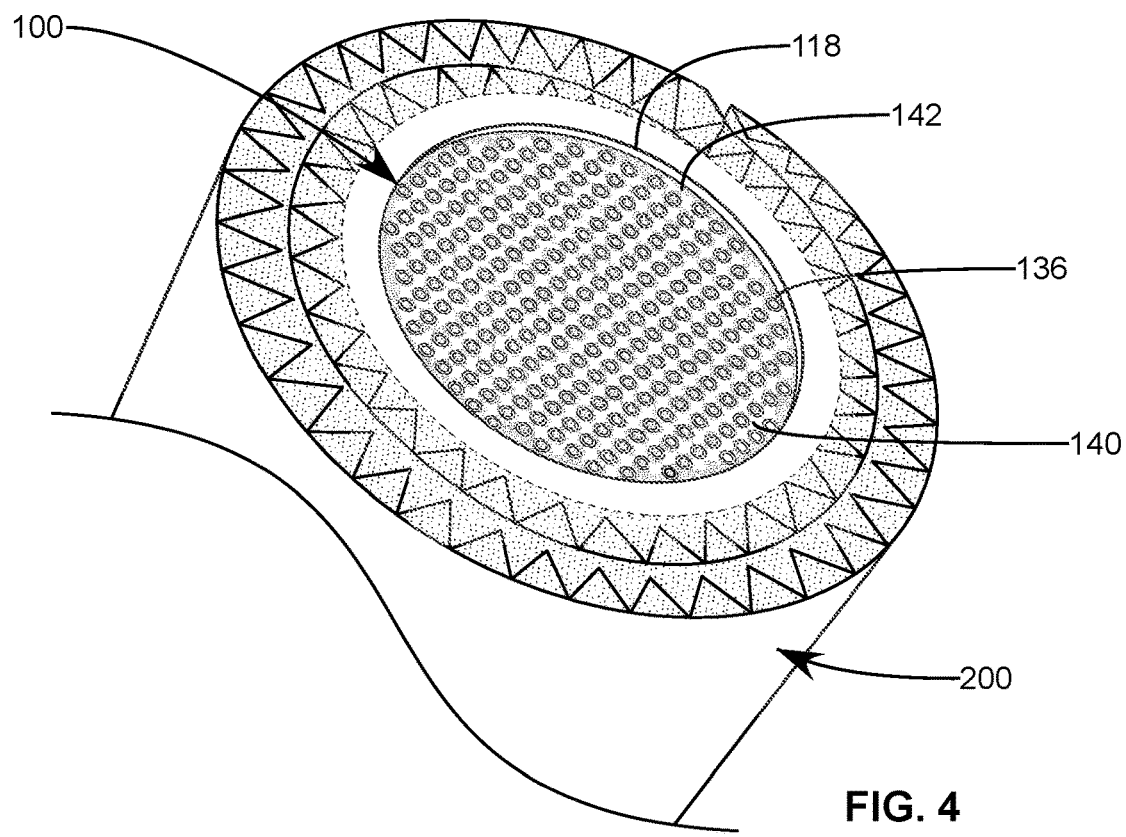
FIG. 4 illustrates a partial perspective end view of a second end of an exemplary ultrafiltration membrane being surrounded by an ion-exchange membrane being adaptable for use in various aspects of the present invention.

In some embodiments, and as illustrated in FIG. 4, a second end 118 of each of the tubular ultrafiltration media 130 is blocked at a closed end 136, wherein the space between each of the ultrafiltration media at the second end includes at least one aperture 140, so as to force any fluid passing from the first end to the second end to enter the tubular ultrafiltration media 130 and pass through a sidewall portion 132 of at least one tubular ultrafiltration media member 130, and exit the second end 118 through the aperture(s) 140. It will be further appreciated that the suspension material 142 holding the relative position of each individual tubular ultrafiltration media can be provided as a non-porous or sealed structure at the first end 114, and as a porous material at the second end 118 so as to force the characteristic flow through the sidewalls 132 as described and collected from an interior of the housing 110 or through the porous second end 118 through micro-apertures 140.

In yet additional embodiments, such as for applications requiring recycled flow through filter systems, the ultrafiltration membrane can be open on both sides and the water can pass through the ultrafiltration membranes in an unfiltered state where only a portion of water permeates through the ultrafiltration media for later ion-exchange within the ion-exchange membrane 200, where the water to be passed through the ion-exchange membrane 200 is gathered via an alternative means from the housing 110. Such embodiments will also be discussed in more detail below.

Figure 5:
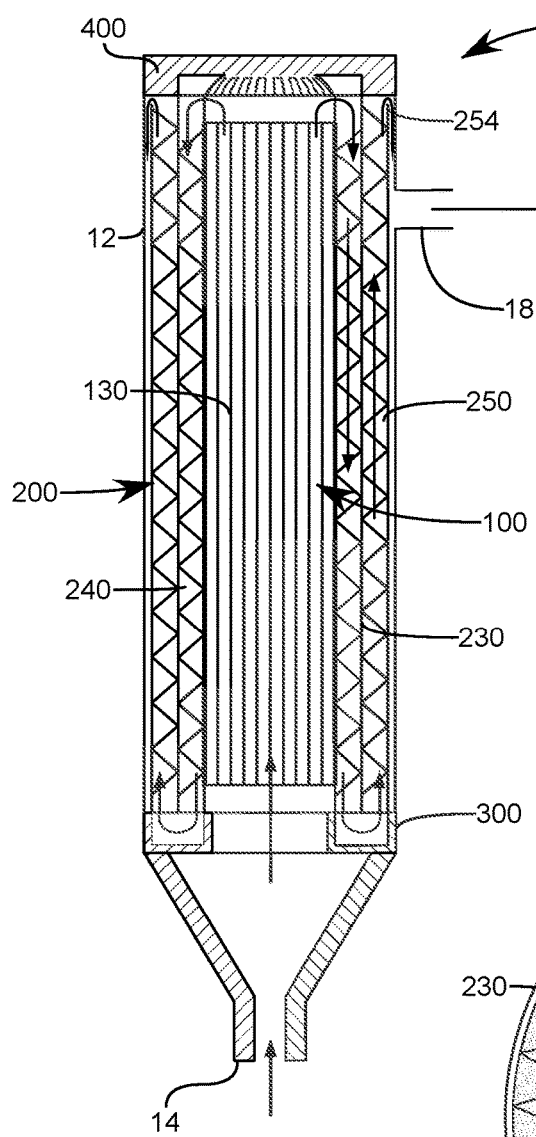
FIG. 5 illustrates a side cross-sectional view of a combination ion-exchange and ultrafiltration filter system illustrative of various aspects of the present invention.
Figure 6:
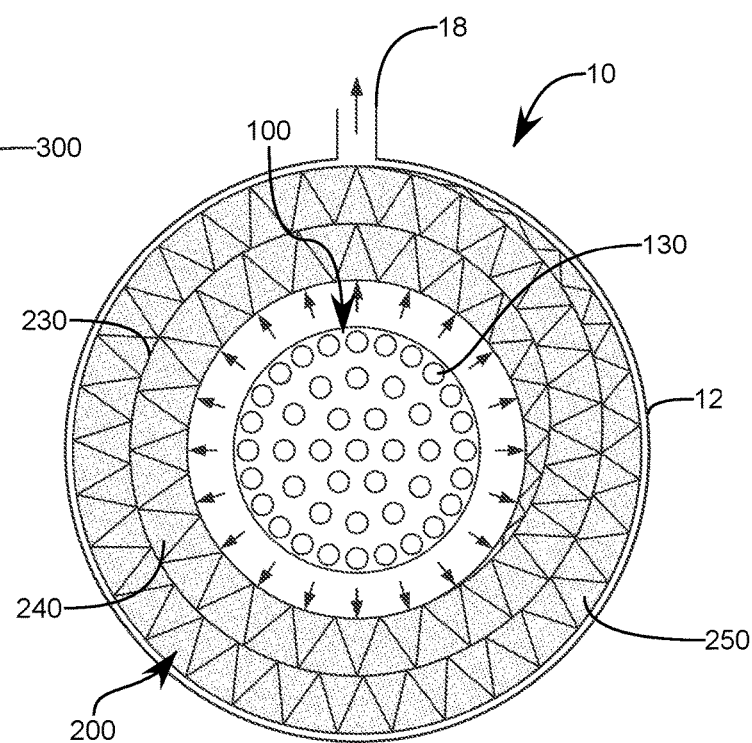
FIG. 6 illustrates an end cross-sectional view of the combination ion-exchange and ultrafiltration filter system of FIG. 5 being illustrative of various aspects of the present invention.

In particular, and as illustrated in FIGS. 5-6, a combination ion-exchange and ultrafiltration filter system 10 is illustrated which includes a housing 12 the housing having an inlet 14 provided at an axial end of the combination ion-exchange and ultrafiltration filter system 10. An outlet 18 is then provided through a sidewall of the combination ion-exchange and ultrafiltration filter system 10 such that a contaminated flow enters the inlet 14 and passes first into the ultrafiltration membrane 100, then through the ion-exchange membrane 200 prior to exiting as a purified flow through the outlet 18. In this manner, the combination ion-exchange and ultrafiltration filter system 10 can be configured to provide ultrafiltration first, then ion-exchange second, in accordance with various potential intended uses.

In this embodiment, the ultrafiltration membrane 100 can be configured such that all of the flow is forced through a sidewall of the tubular ultrafiltration media 130 where it fills the housing and ultimately exits the housing through an upper section, whereupon the flow is directed through a flow dispersement disk 400 and into an interior layer 240 of the ion-exchange membrane. The flow passes the through an entire axial length of the ion-exchange membrane 200 where it enters another flow dispersement disk 300 which then redirects the flow back up through an exterior layer 250 of the ion-exchange membrane 200 such that the volume of filter media of the ion-exchange membrane is utilized to an increased potential. It will then be appreciated that in this embodiment the ion-exchange membrane 200 is spaced from the sidewall 12 of the housing such that the filtered water can then travel between the ion-exchange membrane after the final pass and to the outlet 18. In some instances, an aperture 254 can be provided about the top of the exterior surface of the ion-exchange membrane 200 so as to allow the flow to pass radially outward from the top of the ion-exchange membrane and into the space within the housing sidewall 12 and through the outlet 18, however, in some alternative embodiments, the exterior surface of the ion-exchange membrane 200 can be provided as a permeable substance, either entirely, or only about the outlet height, so as to allow the flow to travel to the outlet 18.

Figure 7:
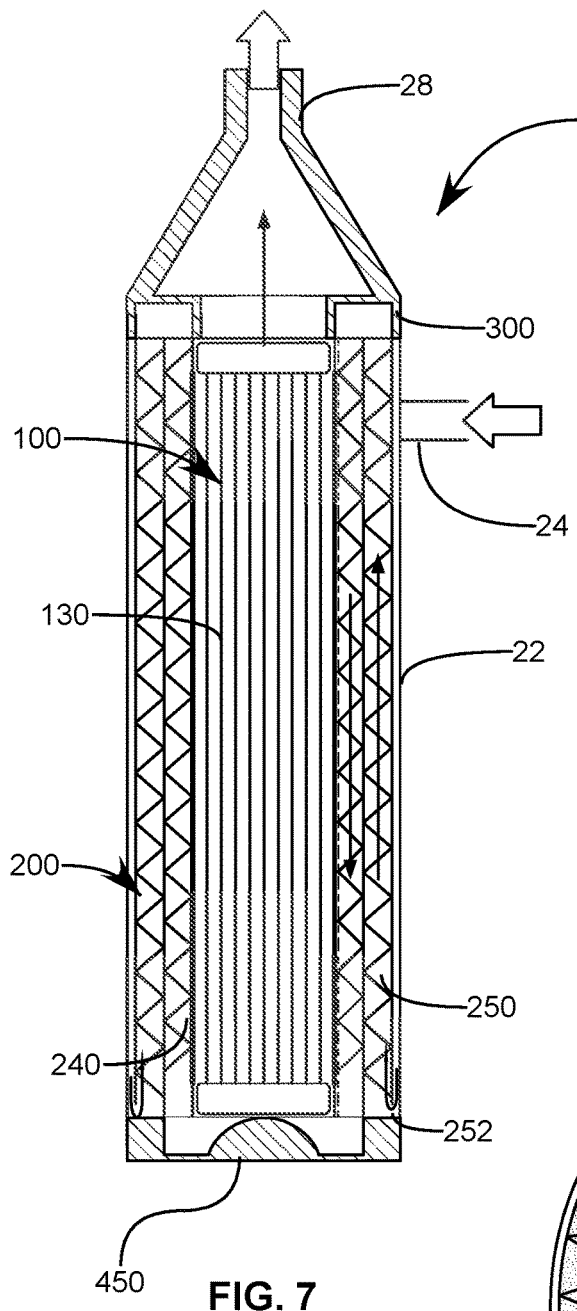
FIG. 7 illustrates a side cross-sectional view of another combination ion-exchange and ultrafiltration filter system illustrative of various aspects of the present invention.
Figure 8:
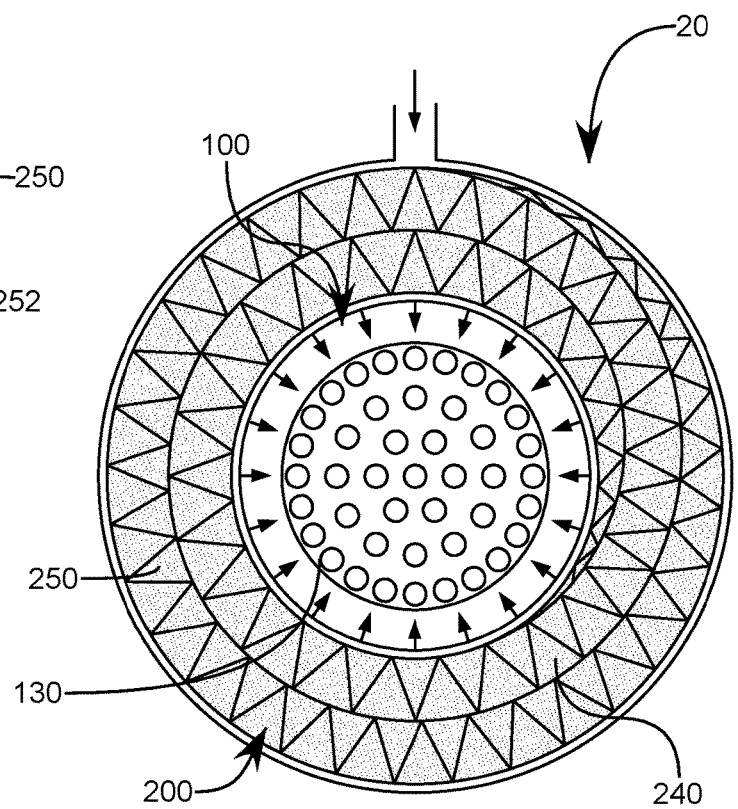
FIG. 8 illustrates an end cross-sectional view of the combination ion-exchange and ultrafiltration filter system of FIG. 7 being illustrative of various aspects of the present invention.

Alternatively, as illustrated in FIGS. 7-8, a combination ion-exchange and ultrafiltration filter system 20 is illustrated which includes an outer body 22 instead with an inlet 24 provided through a sidewall and an outlet 28 provided at an axial end of the combination ion-exchange and ultrafiltration filter system 10. In this manner, the contaminated flow enters the inlet 24 and passes first into the ion-exchange 200 and then through ultrafiltration membrane 100 prior to exiting as a purified flow through the outlet 28. In this manner, the combination ion-exchange and ultrafiltration filter system 20 can instead be configured to provide ion-exchange first, then ultrafiltration second, in accordance with various potential intended uses.

In this embodiment, the contaminated flow can be received through inlet 24 wherein the flow enters the housing 22 and then travels to a bottom portion of the housing in a space between the ion-exchange membrane 200 and the housing sidewall 22. At this point the flow travels through aperture 252 and into the exterior layer 250 of the ion-exchange membrane 200. The flow then travels upwards along the entire axial length of the ion exchange membrane where the flow is redirected through a flow dispersement disk 400 back into the interior layer 240 of the ion-exchange membrane 200 where the flow then again travels the entire axial length of the ion-exchange membrane for a second pass. The flow then travels into another flow dispersement disk 450 wherein it is redirected through the ultrafiltration membrane 100 either inside to outside of each tubular ultrafiltration media 130 or outside to inside. The flow then passes through a clear central portion of the flow dispersement disk 400 and through the outlet 28 as a clean or fully filtered flow. In some instances, an aperture 252 can be provided about the bottom of the exterior surface of the ion-exchange membrane 200 so as to allow the flow to pass radially inward from the space within the housing sidewall 22 into the exterior layer 250 of the ion-exchange membrane 200, however, in some alternative embodiments, the exterior surface of the ion-exchange membrane 200 can be provided as a permeable substance about the bottom edge, so as to allow the flow to enter the ion-exchange membrane 200.

Figure 9:
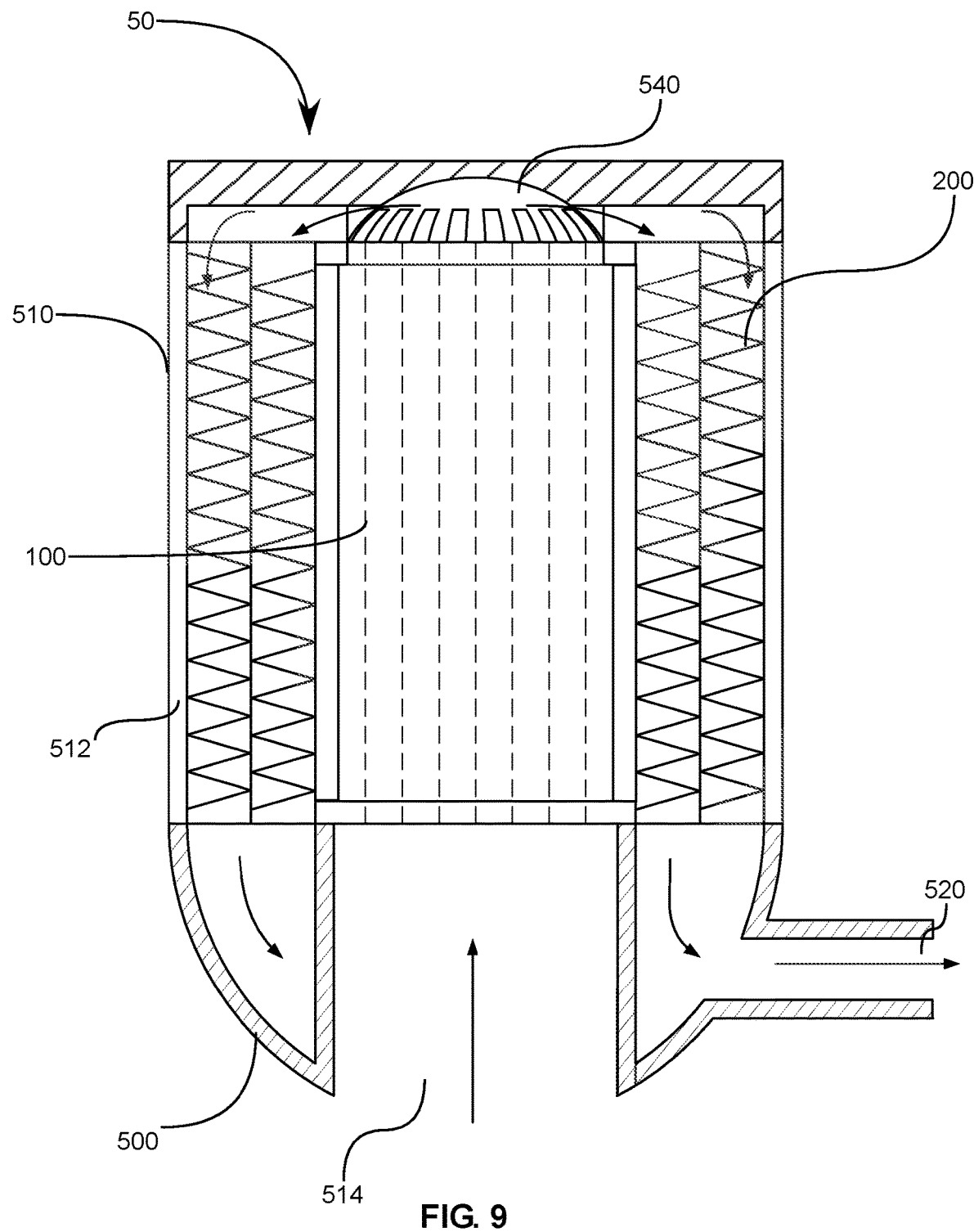
FIG. 9 illustrates a side cross-sectional view of yet another combination ion-exchange and ultrafiltration filter system illustrative of various forced filtration arrangements in accordance with various aspects of the present invention.

FIG. 9 illustrates an alternative combination ion-exchange and ultrafiltration filter system 50 having an alternative housing 510. The housing 510 can have an annular sidewall 512 which includes a hollow dome 500 effectively enclosing a bottom end, and a flow dispersement disk 540, which is similar to the flow dispersement disk 400 of FIG. 5 and as discussed below in regard to FIGS. 16A-B. The hollow dome 500 can be provided with an inlet 514 which receives a contaminated flow and directs the contaminated flow into the ultrafiltration membrane 100, which can be similar to those discussed with regard to FIGS. 3-4 which receives the contaminated flow, and forces all of the flow through the ultrafiltration media into the interior of the housing, which can then be collected through a porous end as shown into a flow dispersement disk 540 which then directs the flow through the ion-exchange membrane 200 and out through outlet 520. It will be appreciated that the ultra-filtered flow can be collected through the end of the ultrafiltration membrane 100 as shown, or can be collected by another suitable means from the housing prior to being directed through the ion-exchange membrane 200.

As shown the hollow dome 500 can have a sealed cylindrical central portion to act as the inlet for receiving the contaminated flow, wherein the hollow annular outer portion of the hollow dome 500 can collect the double filtered water and then be provided with a suitable outlet 520 as shown.

Figure 10:
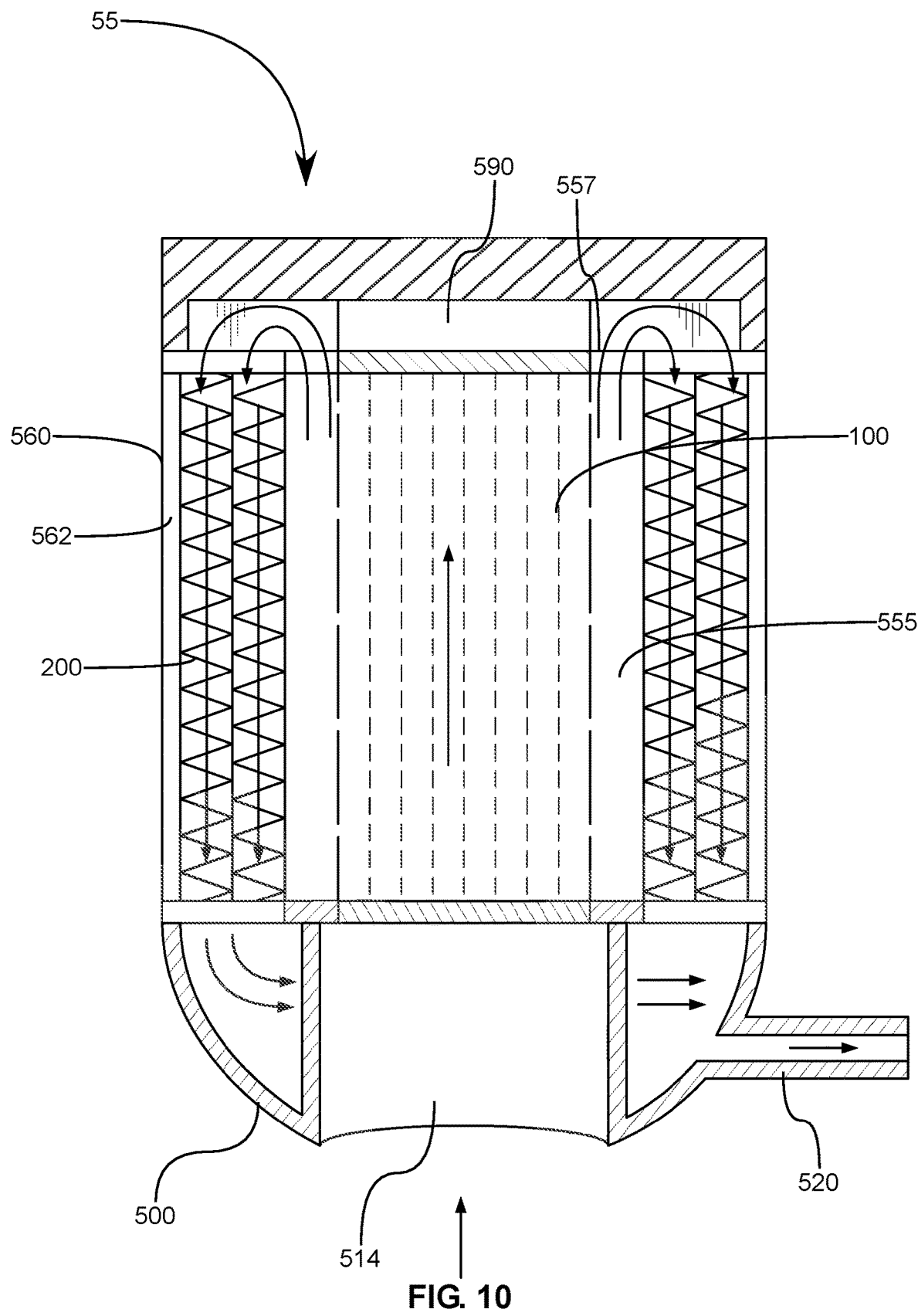
FIG. 10 illustrates a side cross-sectional view of yet another combination ion-exchange and ultrafiltration filter system illustrative of various forced filtration arrangements in accordance with various aspects of the present invention.

FIG. 10 illustrates an alternative combination ion-exchange and ultrafiltration filter system 55 having an alternative housing 560. The housing 560 can have an annular sidewall 562 which includes a hollow dome 500 effectively enclosing a bottom end, and another alternative flow dispersement disk 590, which is similar to the flow dispersement disk 590 and as discussed below in regard to FIGS. 19A-B. The hollow dome 500 can be provided with an inlet 514 which receives a contaminated flow and directs the contaminated flow into the ultrafiltration membrane 100, which in this embodiment differs from that as shown in FIG. 9 because the opposing end portion of the ultrafiltration membrane 100 is blocked and the ultra-filtered water is collected from an enlarged ultrafiltration housing 555 through a bypass 557 provided at a top portion which then enters channels provided in a flow dispersement cap 590 as discussed above, which then directs the flow through the ion-exchange membrane 200 back down into the exterior annular portion of the hollow dome and out through outlet 520.

It will be appreciated that the enlarged ultrafiltration housing can have a permeable inner wall 556 which separates the housing from the tubular ultrafiltration media so as to define a collection area therebetween.

Similar to the embodiment of FIG. 9, and as shown, the hollow dome 500 can have a sealed cylindrical central portion to act as the inlet for receiving the contaminated flow, wherein the hollow annular outer portion of the hollow dome 500 can collect the double filtered water and then be provided with a suitable outlet 520 as shown.

Figure 11:
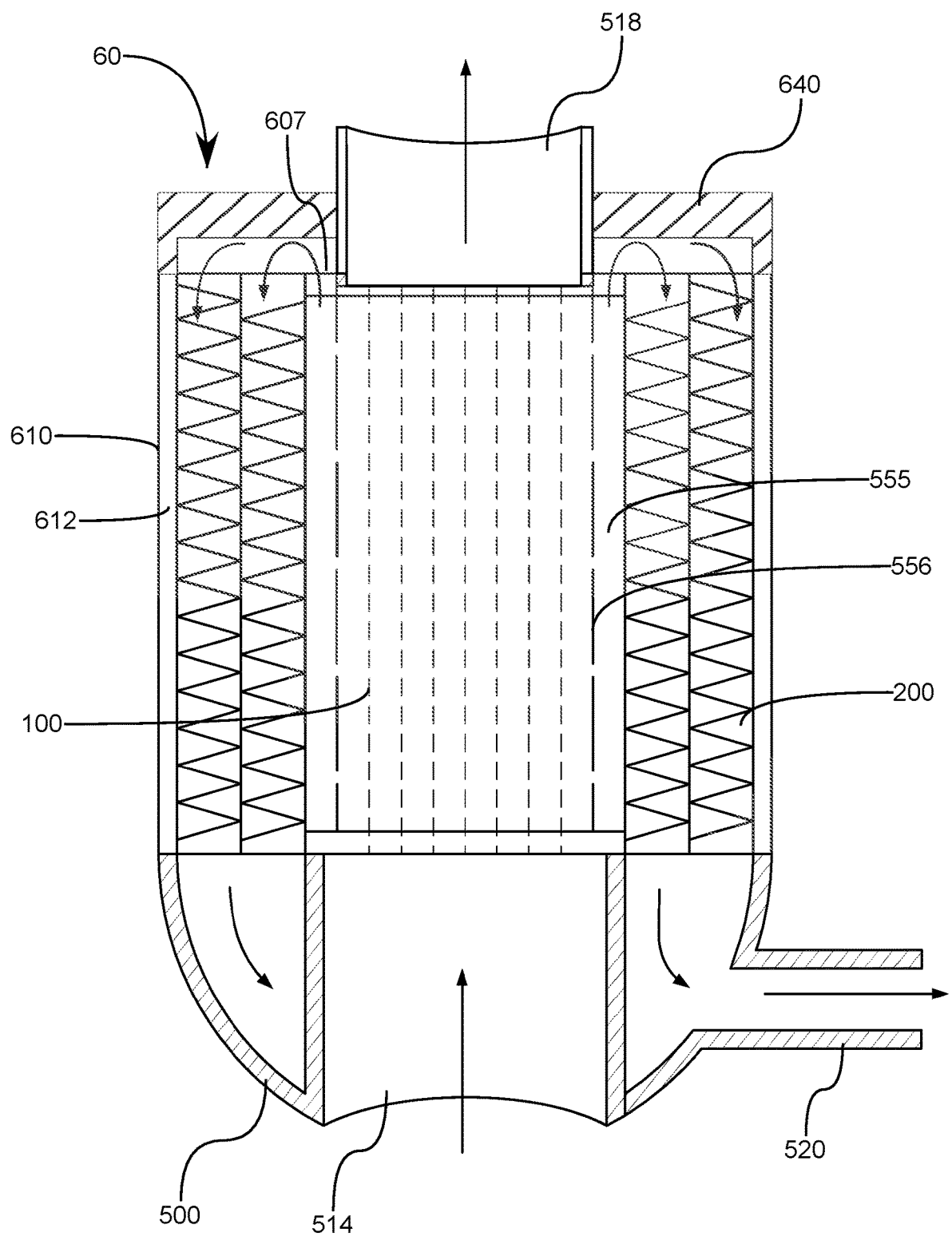
FIG. 11 illustrates a side cross-sectional view of yet another combination ion-exchange and ultrafiltration filter system illustrative of various flow-through or recirculation arrangements in accordance with various aspects of the present invention.

FIG. 11 illustrates an alternative combination ion-exchange and ultrafiltration filter system 60 which illustrates a flow-through or recycling flow filtration system having an alternative housing 610. The housing 610 can have an annular sidewall 612 which includes a hollow dome 500 effectively enclosing a bottom end, and another alternative flow dispersement disk 640, which is similar to the flow dispersement disk 400 as discussed below in regard to FIGS. 18A-B having a hollow central flow through portion for receiving an unfiltered portion for recycle, or flow-through water, through waste outlet or dirty outlet 518. The hollow dome 500 can be provided with an inlet 514 which receives a contaminated flow and directs the contaminated flow into the ultrafiltration membrane 100.

In this embodiment, the ultrafiltration membrane 100 can be provided with tubular ultrafiltration media which is open on both ends and thus allows for flow-through, wherein only a portion of the unfiltered permeates through sidewalls the ultrafiltration media as ultra-filtered water and is then collected in the enlarged ultrafiltration housing 555, which is the same as that discussed above with respect to FIG. 10. Similarly, water is collected from the enlarged ultrafiltration housing 555 through a bypass 607 provided at a top portion which then enters channels provided in a flow dispersement cap 640 as discussed above, which then directs the flow through the ion-exchange membrane 200 back down into the exterior annular portion of the hollow dome and out through outlet 520.

Similar to the embodiment of FIG. 9, and as shown, the hollow dome 500 can have a sealed cylindrical central portion to act as the inlet for receiving the contaminated flow, wherein the hollow annular outer portion of the hollow dome 500 can collect the double filtered water and then be provided with a suitable outlet 520 as shown.

Figure 12A:
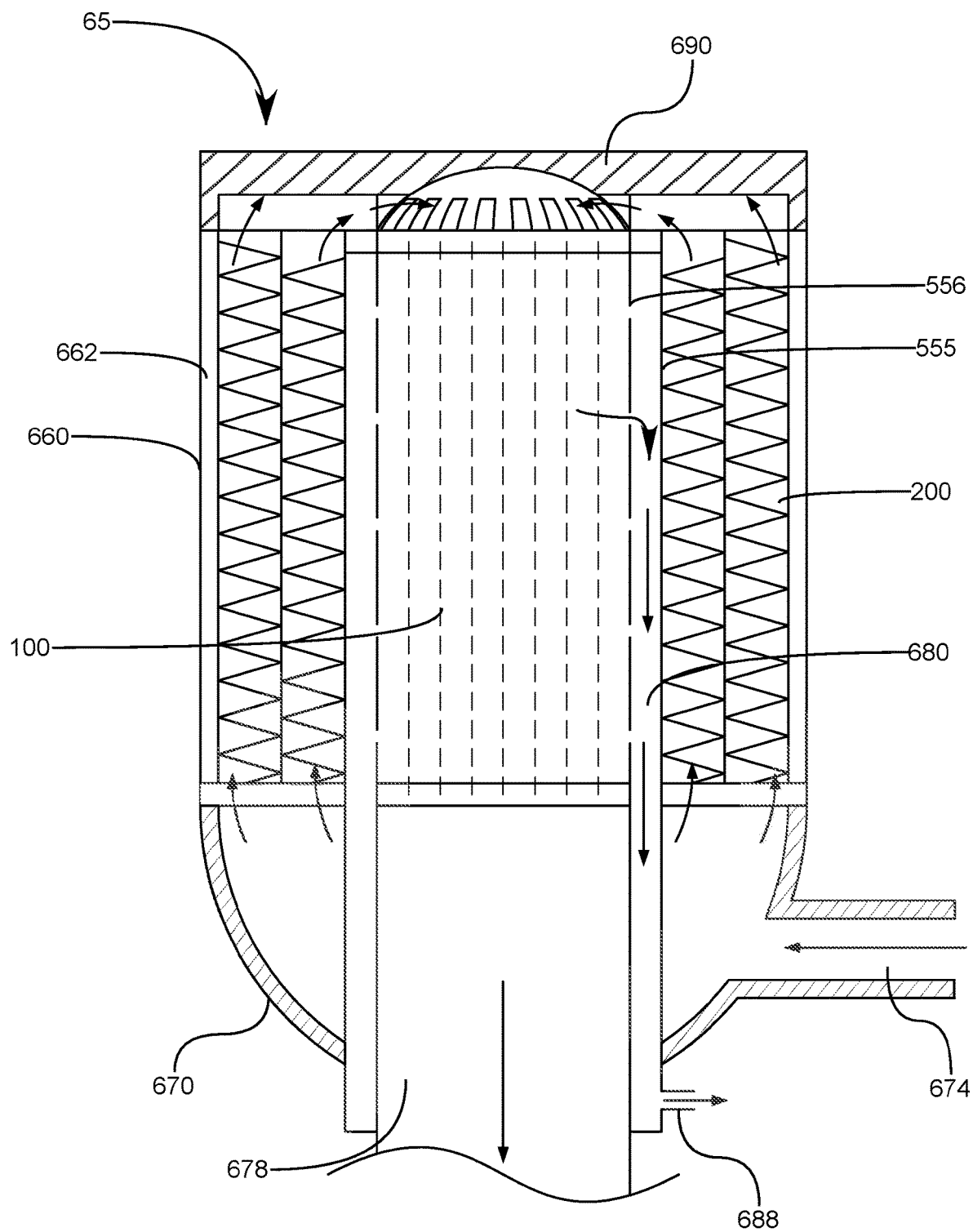
FIGS. 12A-B illustrate side cross-sectional views of yet additional combination ion-exchange and ultrafiltration filter systems illustrative of various flow-through or recirculation arrangements in accordance with various aspects of the present invention.
Figure 12B:
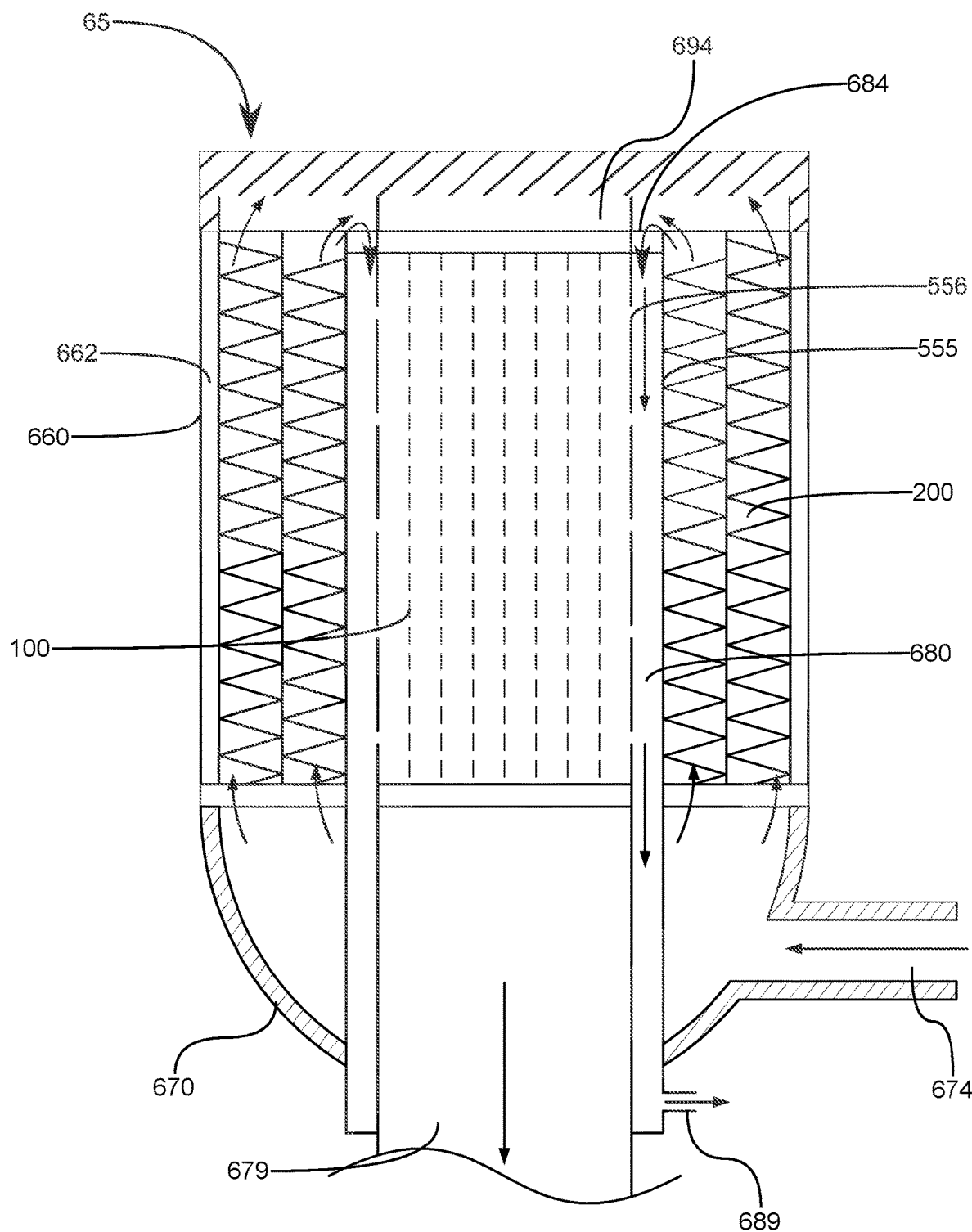

FIGS. 12A-B illustrates an alternative combination ion-exchange and ultrafiltration filter system 65 which illustrates a reverse flow with a partial flow-through or recycling flow filtration system having an alternative housing 660. The housing 660 can have an annular sidewall 662 which includes a hollow dome 670 effectively enclosing a bottom end, alternative flow dispersement disks 690 or 694 depending on arrangement, which are similar in concept as discussed below in regard to FIGS. 19A-B having various channels about a circumferential portion. The hollow dome 670 can be provided with an inlet 674 which receives a contaminated flow and directs the contaminated flow first into the ion exchange membrane 200, then into the flow dispersement disk 690 or 694, and then optionally through a flow through sleeve 680 and to a waste or partially filtered outlet 688 or 689.

Illustrated in FIG. 12A is an embodiment wherein the flow dispersement disk 690 forces all of the ion-exchanged water is caused to pass through a central portion of the ultrafiltration membrane 100 wherein a portion of the ion-exchanged water permeates is through the sidewalls of the tubular ultrafiltration to inside the enlarged housing 555 through the optional permeable side wall 556 into a double filtered sleeve portion 680 to be collected from the clean outlet 688.

Illustrated in FIG. 12B is an embodiment wherein an alternative flow dispersement disk 694 instead forces the ion-exchanged flow into the exterior portion of the ultrafiltration membrane 100 through circumferential apertures or channels 684. In this embodiment a portion of the ion-exchanged flow can then pass to the inside of the tubular ultrafiltration media from inside the enlarged housing 555 wherein clean water is collected through semi-clean outlet 678 and only single ion-exchanged water is collected through semi-clean outlet 688.

In this embodiment, the ultrafiltration membrane 100 can be provided with tubular ultrafiltration media which is open on both ends and thus allows for flow-through, wherein only a portion of the unfiltered permeates through sidewalls the ultrafiltration media as ultra-filtered water and is then collected in the enlarged ultrafiltration housing 555, which is the same as that discussed above with respect to FIG. 10. Similarly, water is collected from the enlarged ultrafiltration housing 555 through a bypass 607 provided at a top portion which then enters channels provided in a flow dispersement cap 640 as discussed above, which then directs the flow through the ion-exchange membrane 200 back down into the exterior annular portion of the hollow dome and out through outlet 520.

Figure 13:
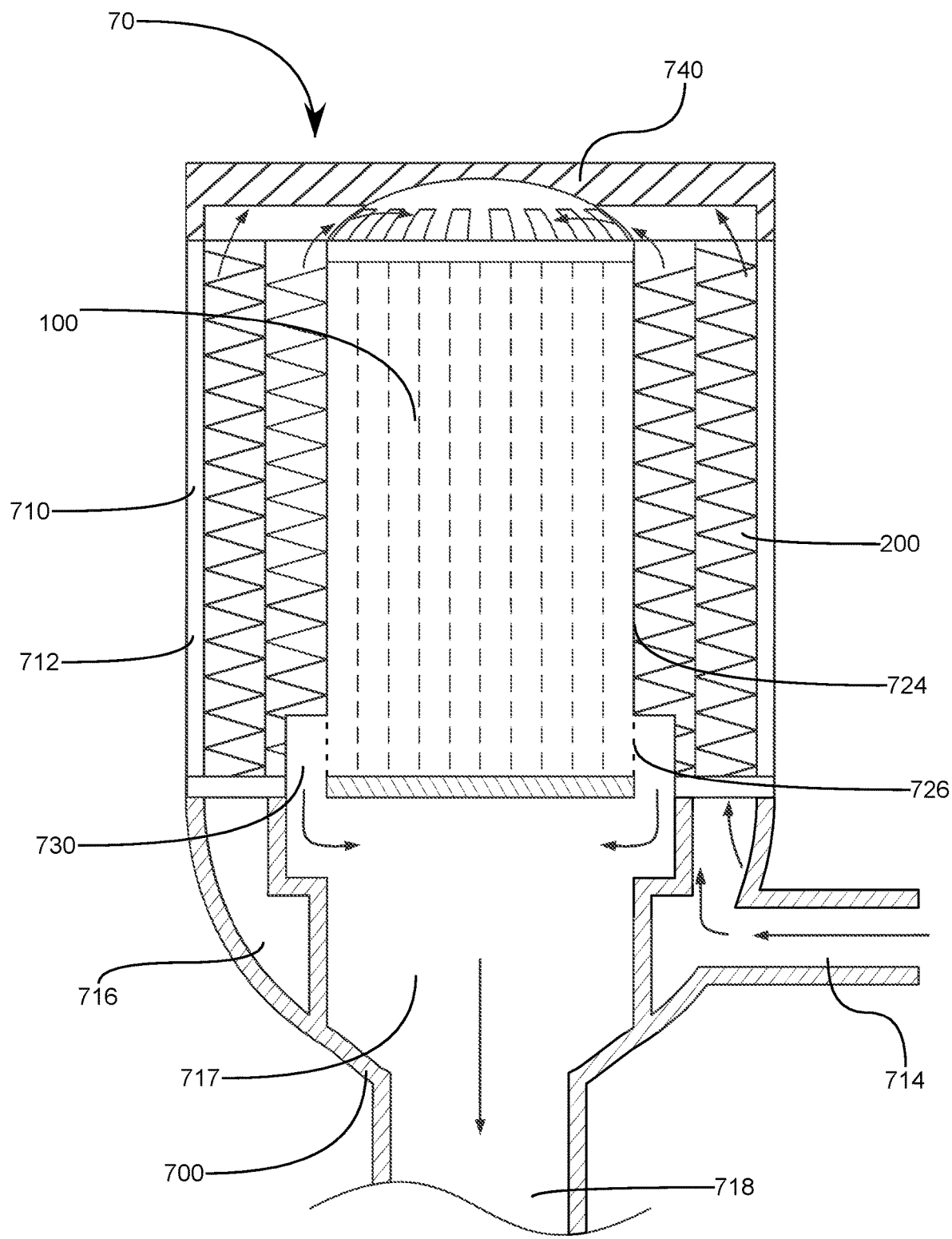
FIG. 13 illustrates a side cross-sectional view of yet another combination ion-exchange and ultrafiltration filter system illustrative of various forced filtration arrangements in accordance with various aspects of the present invention.

FIG. 13 illustrates an alternative forced filtration, or non-flow-through, combination ion-exchange and ultrafiltration filter system 70 having an alternative housing 710. The housing 710 can have an annular sidewall 712 which includes a hollow bifurcated dome 700 effectively enclosing a bottom end, and enclosed at the top by another flow dispersement disk 740, which is similar to the flow dispersement disk 400 and as discussed below in regard to FIGS. 16A-B. The hollow bifurcated dome 700 can be provided with an inlet 714 which receives a contaminated flow and directs the contaminated flow thorough an annular dirty flow portion 716 and into a bottom portion of the ion-exchange membrane 200. The flow then passes through the ion-exchange membrane 200 where it exits a top portion and is redistributed through flow dispersement disk 740 into the interior of the tubular ultrafiltration media of the ultrafiltration membrane 100 which is entirely closed at a bottom end. The flow then passes through the sidewalls of the ultrafiltration membrane 100 and is collected within the housing 724 where it can then exit the housing 724 through a permeable or open section 726 provided about a bottom end of the housing 724. From the open section 726 the flow can then enter bypass channel 730 where it can travel through a clean portion 717 of the bifurcated hollow dome 700 and on to the clean outlet 718.

Figure 14:
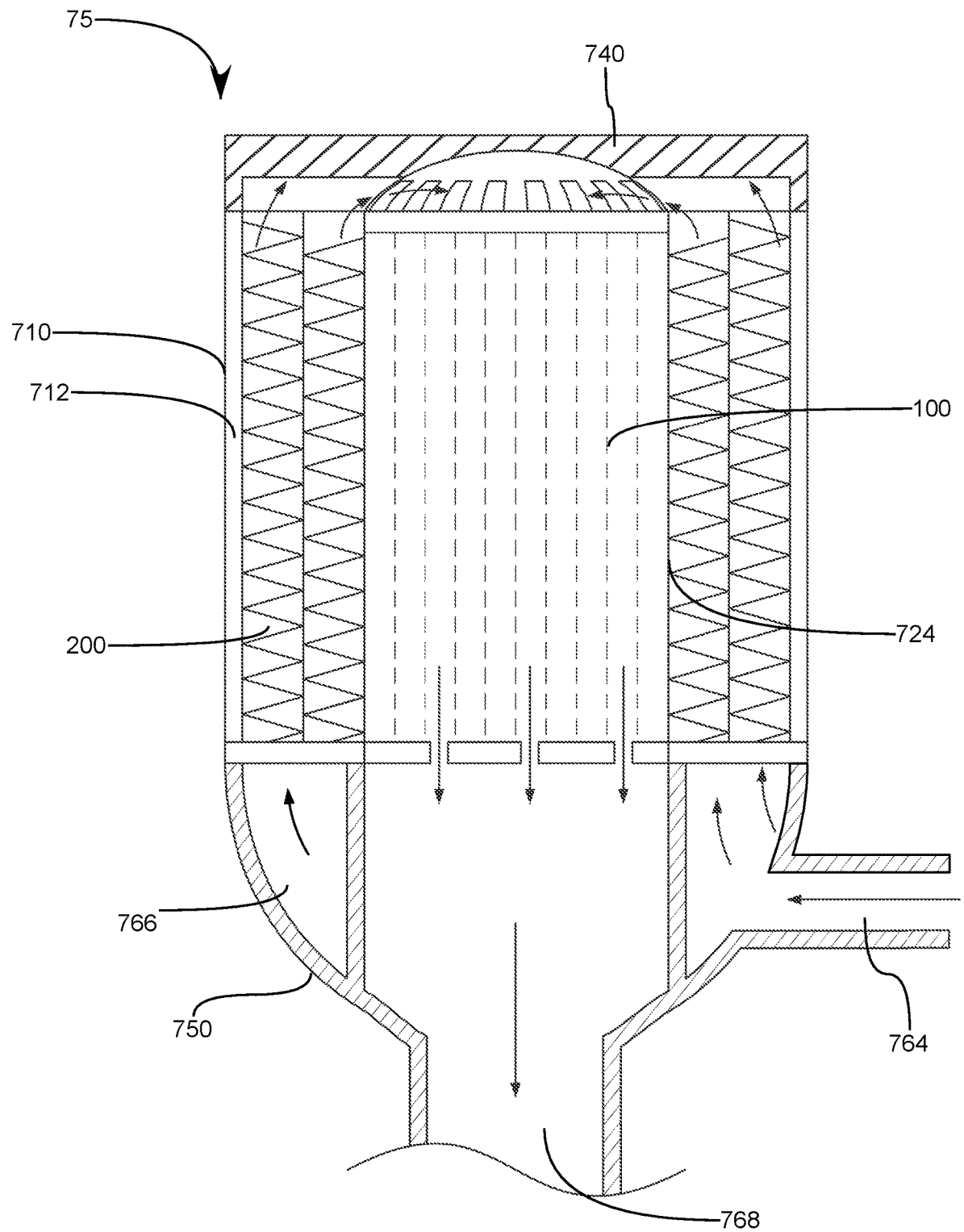
FIG. 14 illustrates a side cross-sectional view of yet another combination ion-exchange and ultrafiltration filter system illustrative of various forced filtration arrangements in accordance with various aspects of the present invention.

FIG. 14 illustrates an alternative forced filtration, or non-flow-through, combination ion-exchange and ultrafiltration filter system 75 having an alternative housing 710. The housing 710 can have an annular sidewall 712 which includes an alternative hollow bifurcated dome 750 effectively enclosing a bottom end, and enclosed at the top by another alternative flow dispersement disk 740, which is similar to the flow dispersement disk 400 and as discussed below in regard to FIGS. 16A-B. The hollow bifurcated dome 750 can be provided with an inlet 764 which receives a contaminated flow and directs the contaminated flow thorough an annular dirty flow portion 766 and into a bottom portion of the ion-exchange membrane 200. The flow then passes through the ion-exchange membrane 200 where it exits a top portion and is redistributed through flow dispersement disk 740 into the interior of the tubular ultrafiltration media of the ultrafiltration membrane 100 which has closed tubular ends at the bottom end. The flow then passes through the sidewalls of the ultrafiltration membrane 100 and is collected within the housing 724. The difference between this arrangement and the arrangement of FIG. 13 is that this arrangement utilizes an ultrafiltration membrane having a permeable end, as described in relation to FIG. 4 such that the bypass channel is no longer necessary and can proceed straight through a porous bottom end of the ultrafiltration membrane 100 and on to the clean outlet 768.

Figure 15:
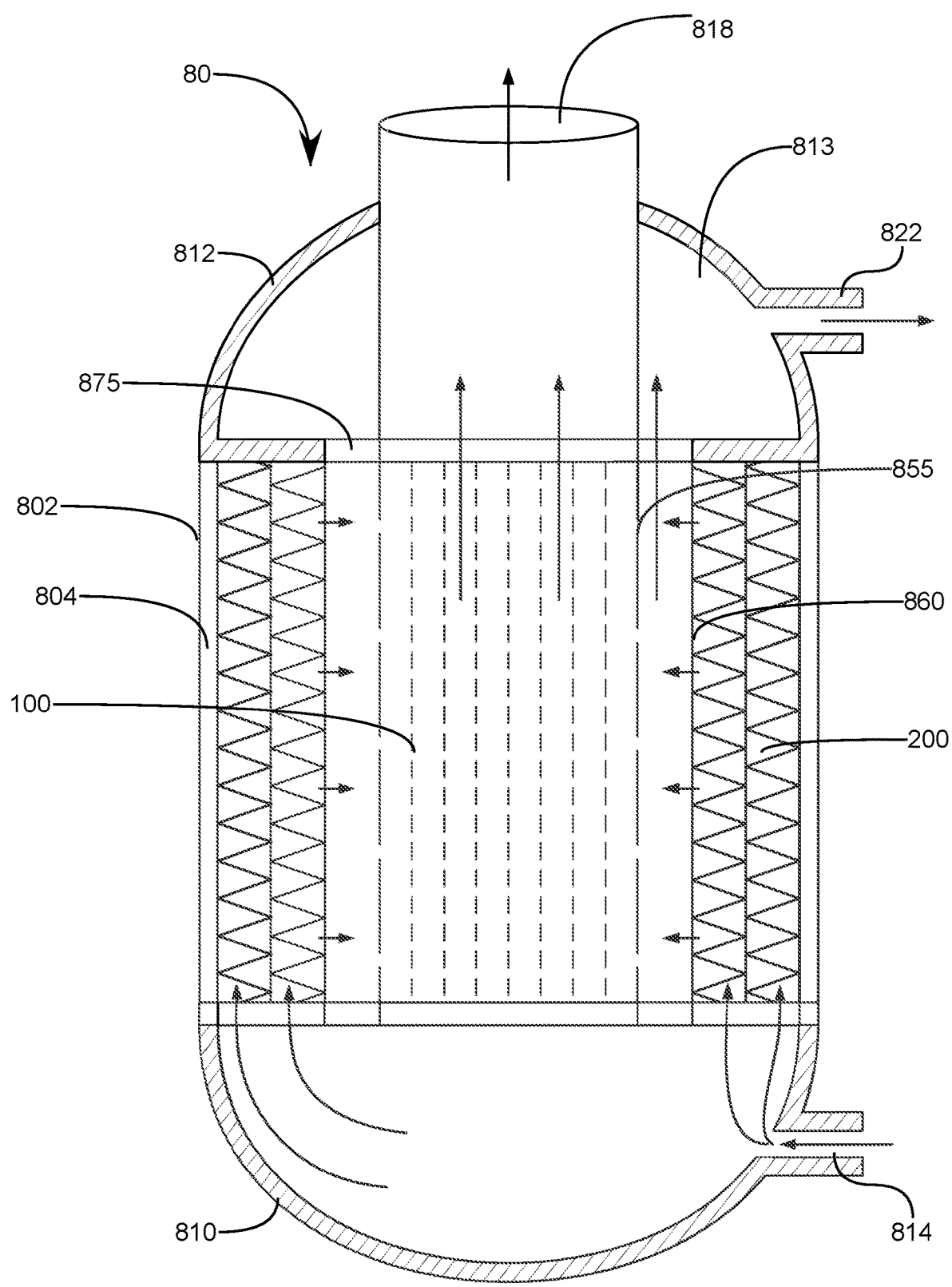
FIG. 15 illustrates a side cross-sectional view of yet another combination ion-exchange and ultrafiltration filter system illustrative of another flow-through or recirculation arrangement in accordance with various aspects of the present invention.

FIG. 15 illustrates an alternative flow-through combination ion-exchange and ultrafiltration filter system 80 having an alternative housing 802. The housing 802 can have an annular sidewall 804 which includes an alternative hollow inlet dome 810 effectively enclosing a bottom end and a bifurcated outlet dome 812 enclosing the top end. The hollow inlet dome 810 can be provided with an inlet 814 which receives a contaminated flow and directs the contaminated flow thorough a portion of the ion-exchange membrane 200. However, in this embodiment the ion-exchange membrane 200 is provided with a permeable interior wall 860 which allows for radial flow inward toward the ultrafiltration membrane 100. In this embodiment, some of the flow will travel through the permeable interior wall, through apertures 855 wherein a percentage of the ion-exchanged water will pass through the ultrafiltration media and be collected through clean outlet 818. However, the rest of the flow will travel upward, either through the ion-exchange media, and ultimately through apertures 875 into a dirty portion of the bifurcated hollow dome 813, where it can exit semi-filtered outlet 822.

Figure 16A:
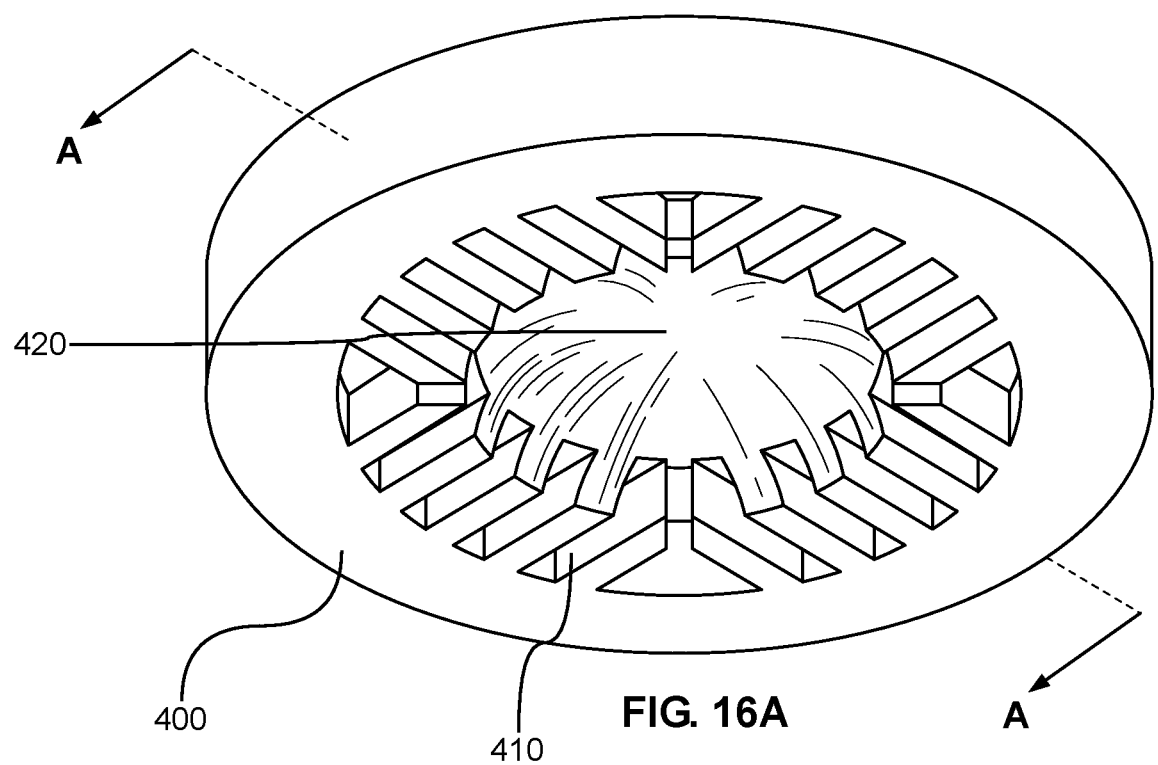
FIGS. 16A-B illustrate perspective and cross sectional views of a first flow dispersement disk adaptable for use in the various embodiments and locations of the combination ion-exchange and ultrafiltration filter systems discussed herein.
Figure 16B:
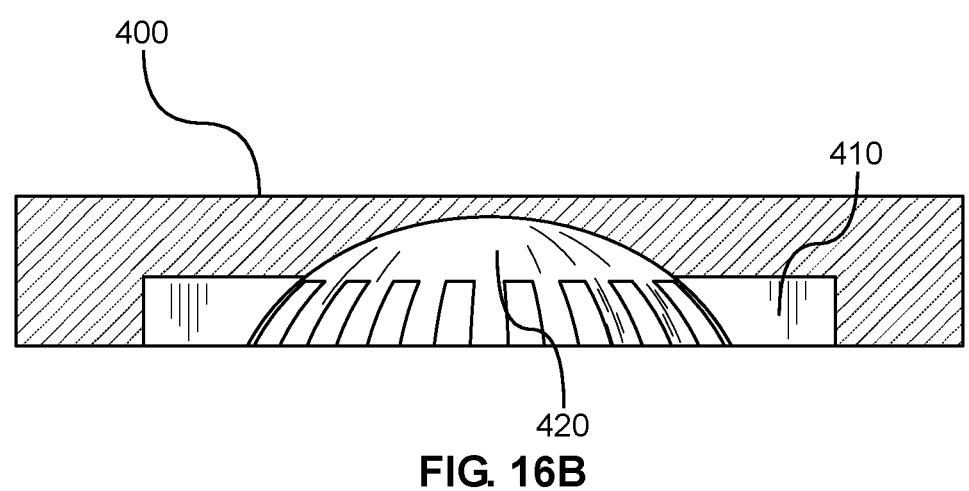

FIGS. 16A-B illustrate perspective and side cross sectional views of one embodiment of a flow dispersement disk 400, the flow dispersement disk 400 can be provided with a plurality of channels 410 embedded therein with a concave hollow dome 420 about the central portion, the channels 410 are configured to redirect the flow received axially at a central portion to disperse the flow radially outward to an outer section, or alternatively receive a flow from a radially outward section and redirect the flow to a central portion. For example, from the annularly disposed ion-exchange membrane to the central axially disposed ultrafiltration module or vice-versa. In particular, this embodiment of the flow dispersement disk 400 is of particular benefit when directing flow received in an axial direction and directing it radially outward. This arrangement is advantageous because a flow which is received into the central portion of the concave hollow dome 420 can then be evenly dispersed radially outward into the annularly disposed channels. It will be appreciated that neither the channels nor the dome portion extend entirely through the flow dispersement disk 400 so as to force the flow back into the desired membrane. Additionally, while the channels 410 are shown as only extending part way to a perimeter, the channels can extend as desired in a radial outward direction so as to properly interface with a desired layer of the ion-exchange membrane.

Figure 17A:
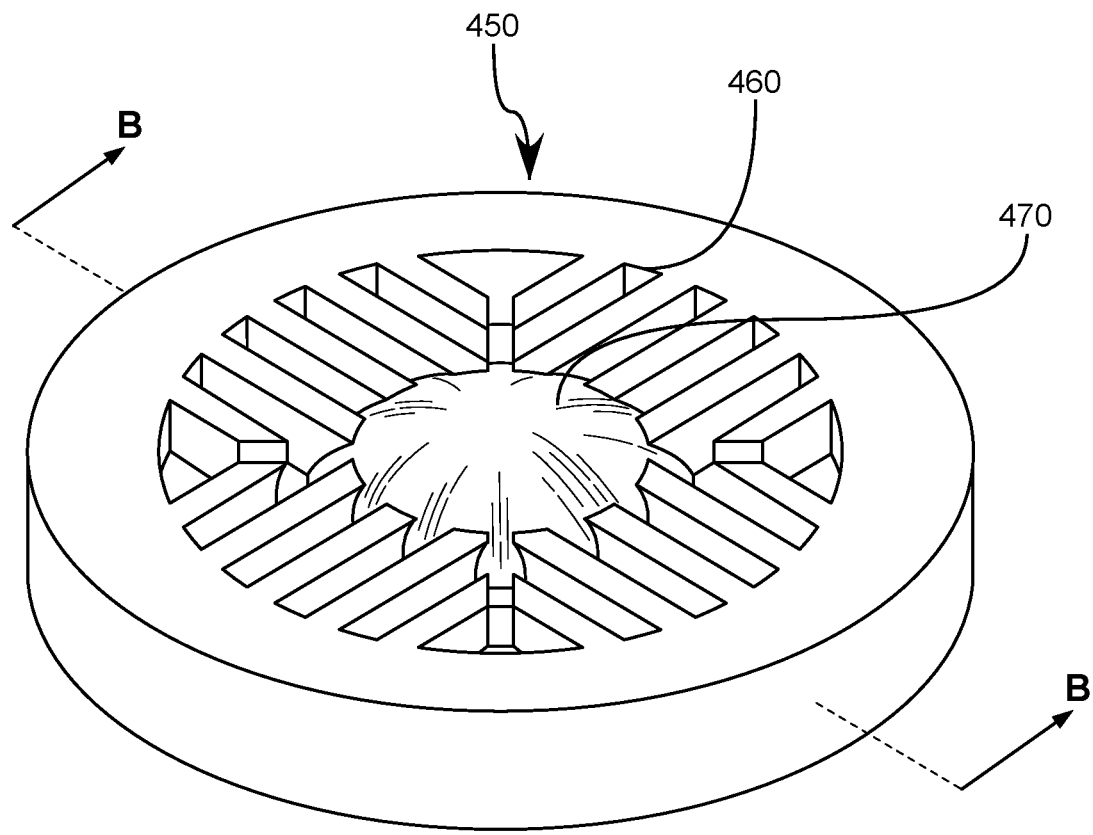
FIGS. 17A-B illustrate perspective and cross sectional views of another flow dispersement disk adaptable for use in the various embodiments and locations of the combination ion-exchange and ultrafiltration filter systems discussed herein.
Figure 17B:
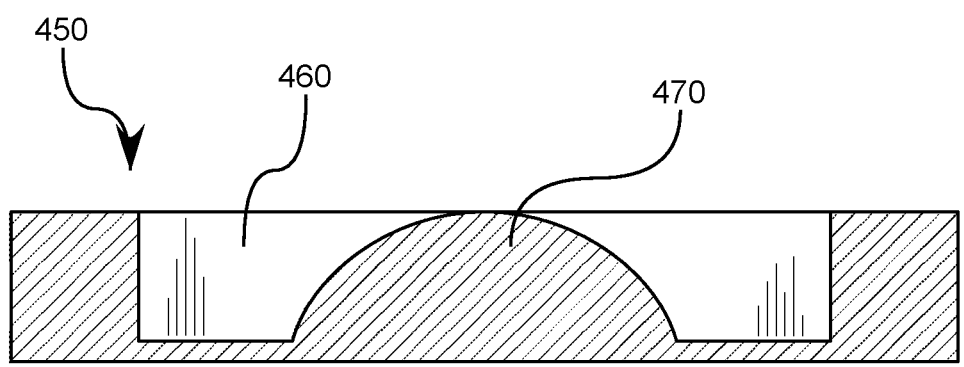

FIGS. 17A-B illustrate perspective and side cross sectional views of one embodiment of a flow dispersement disk 450, the flow dispersement disk 450 can also be provided with a plurality of channels 460 embedded therein with a convex dome 470 about the central portion, the channels 460 are configured to redirect the flow received axially at a central portion to disperse the flow radially outward to an outer section, or alternatively receive a flow from a radially outward section and redirect the flow to a central portion. For example, from the annularly disposed ion-exchange membrane to the central axially disposed ultrafiltration module or vice-versa. In particular, this embodiment of the flow dispersement disk 450 is of particular benefit when directing flow received downwardly about an annular outer portion and redirecting it in an even manner up the face of the convex dome and axially upward. It will be appreciated that neither the channels nor the dome portion extend entirely through the flow dispersement disk 450 so as to force the flow back into the desired membrane. Additionally, while the channels 460 are shown as only extending part way to a perimeter, the channels can extend as desired in a radial outward direction so as to properly interface with a desired layer of the ion-exchange membrane.

Figure 18A:
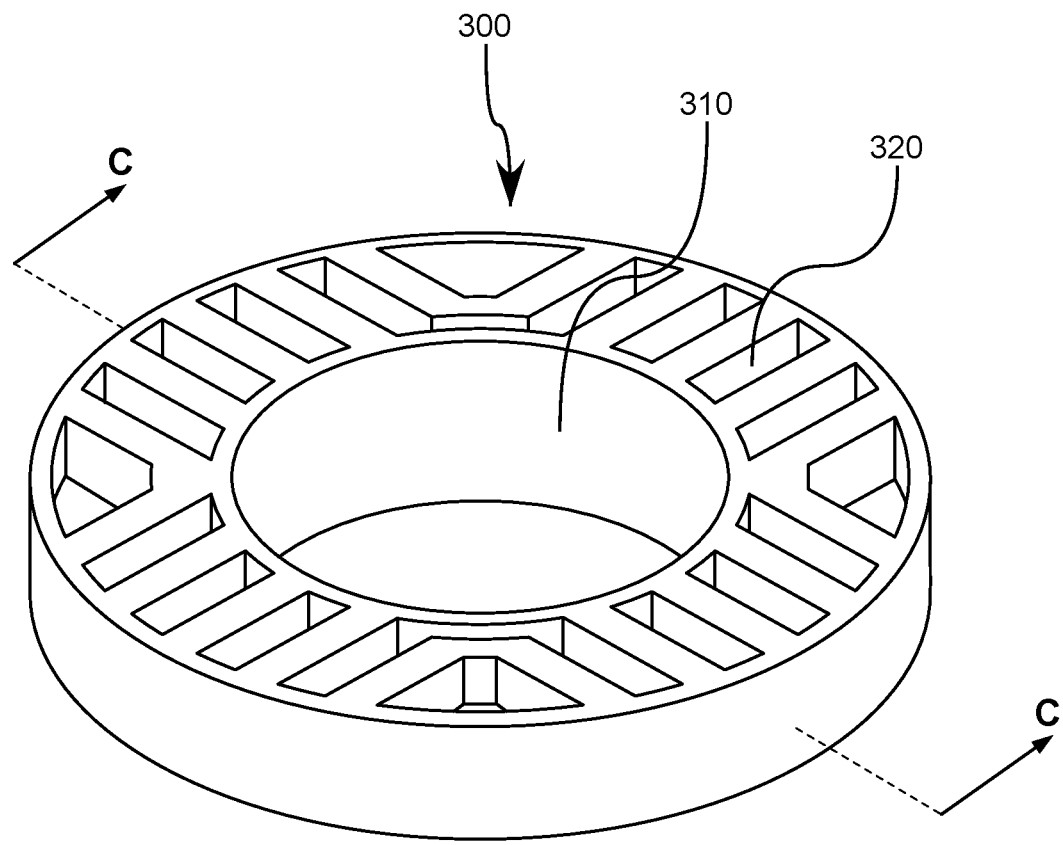
FIGS. 18A-B illustrate perspective and cross sectional views of yet another flow dispersement disk adaptable for use in the various embodiments and locations of the combination ion-exchange and ultrafiltration filter systems discussed herein.
Figure 18B:
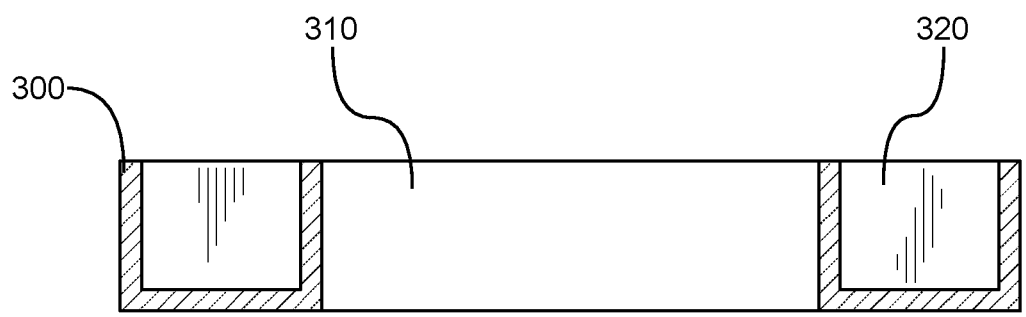

FIGS. 18A-B illustrate a flow dispersement disk 300 intended for use in the various embodiments discussed above, so as to direct flow between the various layers of the ion-exchange membrane 200. The flow dispersement disk 300 can include an open central cylindrical cavity 310 which can allow for contaminated or clean flow to pass therethrough so as to enter or exit an end portion of the ultrafiltration membrane at an inlet or an outlet, depending on configuration. This central cavity is closed, and is impermeable so as to not allow flow through the sidewall thereof. The flow dispersement disk 300 can also include a set of annularly disposed channels 320 embedded therein which extend a partial distance through the flow dispersement disk 300 which are configured to receive a portion of flow from a first layer of the ion-exchange membrane 200 and direct it axially in an opposing direction through an adjacent ion-exchange member layer.

Figure 19A:
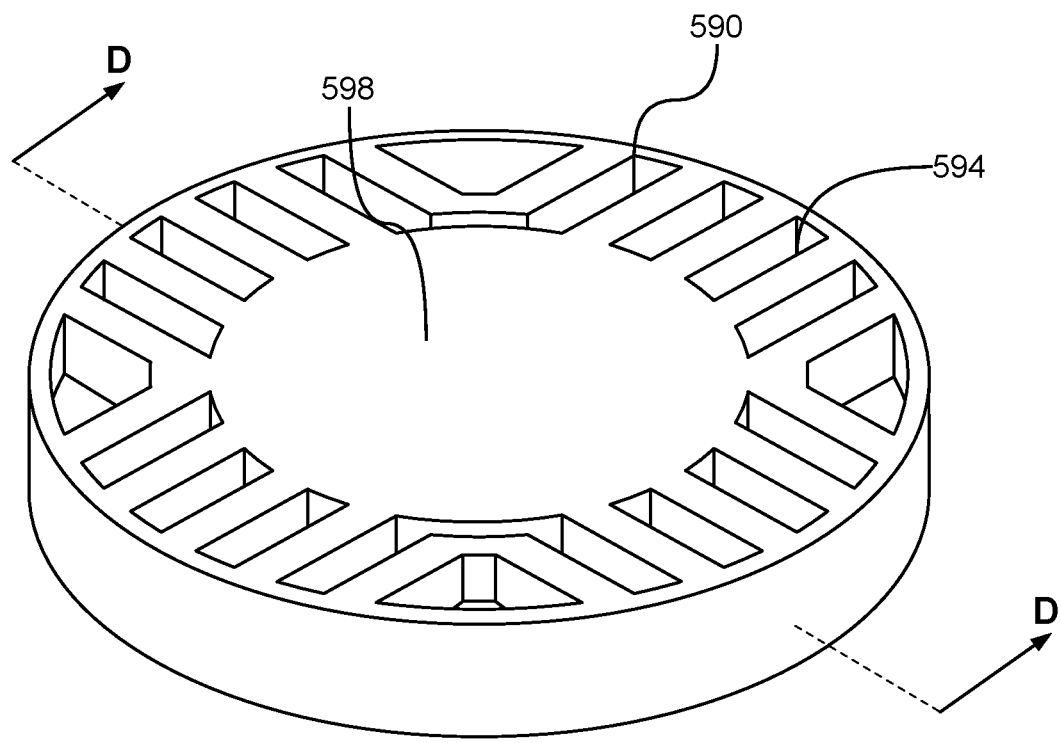
FIGS. 19A-B illustrate perspective and cross sectional views of yet another flow dispersement disk adaptable for use in the various embodiments and locations of the combination ion-exchange and ultrafiltration filter systems discussed herein.
Figure 19B:
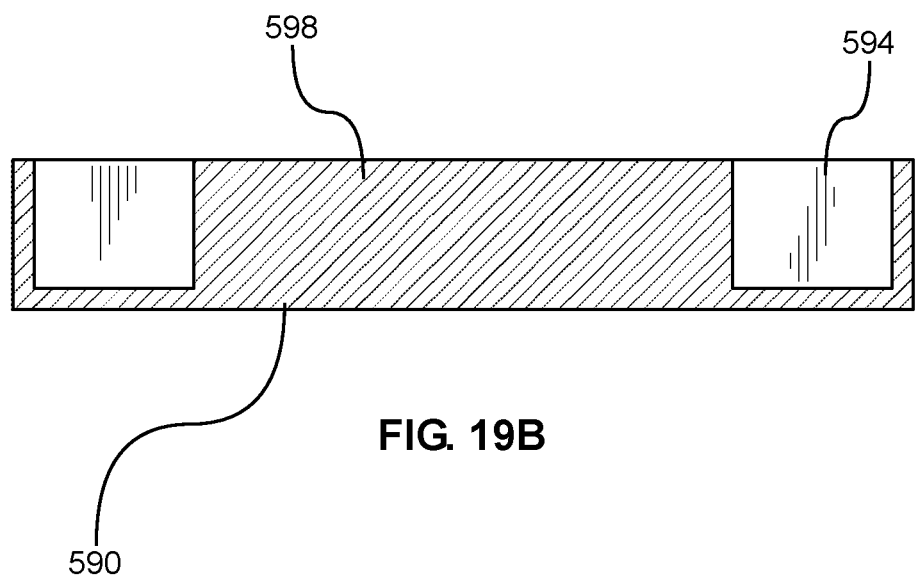

FIGS. 19A-B illustrate perspective and side cross sectional views of yet another flow dispersement disk 590 having a solid core 598 and channels 594 provided about an annular section thereof. This flow dispersement disk 590 is particularly useful when no pass through flow is necessary through a central portion, but when flow direction for the ion-exchange membrane needs to be re-directed for an additional pass.

It will be appreciated that ion-exchange membranes and ultrafiltration membranes degrade or foul at different rates. As such, it will then be understood the ion-exchange membrane or the ultrafiltration membrane can be removable. Where necessary one or more of the flow dispersement disks as appropriately placed can also be removable from the system so as to provide access to the various membranes. It will be appreciated that the ion-exchange membrane 200 can be slidingly disposed over the ultrafiltration membrane 100, and the ultrafiltration membrane 100 can be slidingly disposed within the ion-exchange membrane 200. In this manner either one can be selectively removed, serviced or replaced as needed.

It should also be readily understood that each of the ion-exchange and ultrafiltration components can each be contained in their own housing that is contained within a larger housing or container that. In some embodiments, an ion-exchange or ultrafiltration housing can aid in removably replacing the components as desired for either cleaning, replacement or reconfiguration purposes.

The media for both the ultrafiltration membrane and ion-exchange membrane can also take many forms including resin, ceramic tubes with micro or nano-sized apertures or pathways, other materials with micro or nano-sized apertures or pathways, carbon materials including activated carbon, and so forth. Ultrafiltration primarily refers to the size of particles being filtered, typically between 10-100 nanometers. The ion-exchange media primarily refers to chemical media that attracts or targets specific molecules or particulates that adhere to the media or are absorbed in the media. Both the ultrafiltration media and ion-exchange media, could also be used or converted to be used as a biological media that enables bacteria to thrive, which in turn breaks down dissolved solids or other materials into sometimes less toxic versions. For example, the ultrafiltration media could be a biologic media that breaks down a toxic material where the ion-exchange media adheres the remaining toxic components thereto.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, media, steps, or other aspects discussed herein are for purposes of illustration only, any of which can be applied in any combination with any such features as discussed in alternative embodiments, as appropriate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

What is claimed:

1. An ion-exchange and ultrafiltration filter system, the system comprising:
   a housing having an inlet and a clean outlet;
   an ultrafiltration membrane provided within the housing, the ultrafiltration membrane being provided about a central portion of the housing; and
   an ion-exchange membrane provided within the housing between the ultrafiltration membrane and the housing;
   wherein the ion-exchange membrane includes a plurality of layers;
   wherein each layer is sealed from any adjacent layers,
   wherein a flow is configured to pass through the ion-exchange membrane in alternating axial directions.

2. The ion-exchange and ultrafiltration filter system of claim 1, further arranged such that a contaminated stream being directed through the inlet passes first through the ultrafiltration membrane at a first end, at least of portion of which is then directed through the ion-exchange membrane before exiting the clean outlet.

3. The ion-exchange and ultrafiltration filter system of claim 1, wherein the ion-exchange membrane includes an internal lattice structure and an ion-exchange media.

4. An ion-exchange and ultrafiltration filter system, the system comprising:
   a housing having an inlet and a clean outlet;
   an ultrafiltration membrane provided within the housing, the ultrafiltration membrane being provided about a central portion of the housing; and
   an ion-exchange membrane provided within the housing between the ultrafiltration membrane and the housing;
   wherein the ultrafiltration membrane includes an ultrafiltration housing, the ultrafiltration housing containing a plurality of tubular ultrafiltration media extending axially along the length of the ultrafiltration housing, an axis of the ultrafiltration housing being parallel with an axis of the housing of the ion-exchange and ultrafiltration filter system;

the ion-exchange and ultrafiltration filter system further comprising a cap having a plurality of guided channels, the cap being provided within the external housing, and the plurality of guided channels being configured to direct fluid exiting the ultrafiltration membrane into an end portion of the ion-exchange membrane.

5. The ion-exchange and ultrafiltration filter system of claim 4, wherein a first end of each of the tubular ultrafiltration media is open, and wherein any space between each of the ultrafiltration media is blocked at the first end, and wherein an interior second end of each of the tubular ultrafiltration media is blocked, and wherein the space between each of the ultrafiltration media at the second end includes at least one aperture, so as to force any fluid passing from the first end to the second end to enter the tubular ultrafiltration media and pass through a sidewall portion of at least one tubular ultrafiltration structure, and exit the second end.

6. The ion-exchange and ultrafiltration filter system of claim 4, wherein the cap is sealed to an end portion of the ultrafiltration membrane and an end portion of the ion-exchange membrane.

7. An ion-exchange and ultrafiltration filter system, the system comprising:
a housing having
an inlet provided about an axial end of the housing and an outlet provided about a sidewall of the housing;
an ultrafiltration membrane, comprising
an ultrafiltration housing and
a plurality of tubular ultrafiltration media extending axially along the length of the ultrafiltration housing,
an axis of the ultrafiltration housing being parallel with an axis of the housing,
the ultrafiltration housing being provided about a central portion of the housing; and
an ion-exchange membrane provided within the housing between the ultrafiltration membrane and the housing;
wherein the ion-exchange membrane includes a plurality of layers,
wherein each layer is sealed from any adjacent layers,
wherein a flow passing therethrough is configured to pass through the ion-exchange membrane layers in alternating axial directions.

8. The ion-exchange and ultrafiltration filter system of claim 7, wherein
the ion-exchange membrane includes an internal lattice structure and an ion-exchange media.

9. The ion-exchange and ultrafiltration filter system of claim 7, wherein
a first end of each of the tubular ultrafiltration media is open, and
wherein the space between each of the ultrafiltration media at the first end is blocked, and
wherein a second end of each of the tubular ultrafiltration media is blocked, and
wherein the space between each of the ultrafiltration media at the second end includes at least one aperture, so as to force any fluid passing from the first end to the second end to enter the tubular ultrafiltration media and pass through a sidewall portion of at least one tubular ultrafiltration structure, and exit the second end.

10. An ion-exchange and ultrafiltration filter system, the system comprising:
a housing having
an inlet provided about an axial end of the housing and an outlet provided about a sidewall of the housing;
an ultrafiltration membrane, comprising
an ultrafiltration housing and
a plurality of tubular ultrafiltration media extending axially along the length of the ultrafiltration housing,
an axis of the ultrafiltration housing being parallel with an axis of the housing,
the ultrafiltration housing being provided about a central portion of the housing; and
an ion-exchange membrane provided within the housing between the ultrafiltration membrane and the housing;
further comprising a cap having a plurality of guided channels, the cap being provided within the external housing, and the plurality of guided channels being configured to direct fluid exiting the ion-exchange membrane into the ultrafiltration membrane.

* * * * *